United States Patent [19]
Lee

[11] Patent Number: 6,018,904
[45] Date of Patent: Feb. 1, 2000

[54] VERMIN-PROTECTIVE FOOT PIECE

[76] Inventor: Chien-yu Lee, 4F-1, No. 45, Pao Chung Rd., Hsintien City, Taipei Hsien, Taiwan

[21] Appl. No.: 09/098,818

[22] Filed: Jun. 17, 1998

[51] Int. Cl.[7] .............................. A01M 19/00; A01M 1/22
[52] U.S. Cl. .................................................. 43/98; 43/112
[58] Field of Search .................................... 43/1, 98, 112, 43/124; 119/51.5, 52.3, 61; 52/101

[56] References Cited

U.S. PATENT DOCUMENTS 5,937,788  8/1999  Boyd ...................................... 119/52.3

*Primary Examiner*—Michael J. Carone
*Assistant Examiner*—Darren W. Ark
*Attorney, Agent, or Firm*—Pro-Techtor International Services

[57] ABSTRACT

A vermin-protective foot piece mounted on the bottom of an apparatus to support the apparatus on a flat surface and to prohibit vermin from entering the apparatus, which produces an electric shock when a vermin creep up a cylindrical base of the foot piece and touches two adjacent naked wires on the foot piece, causing the vermin to be killed.

1 Claim, 3 Drawing Sheets

VERMIN-PROTECTIVE FOOT PIECE

BACKGROUND OF THE INVENTION

The present invention relates to foot pieces for apparatus, and more particularly to a vermin-protective foot piece for mounting on the bottom of an apparatus to support the apparatus on a flat surface which produces an electric shock when a vermin creep up on it, causing the vermin to be killed.

Regular electric cooking apparatus or electric apparatus for drying or washing kitchen utensils are commonly equipped with foot pieces for supporting on a flat surface. Conventional foot pieces for this purpose are commonly molded from plastics or rubber. These foot pieces can only support the apparatus firmly in place, however they cannot prohibit vermin from entering the apparatus.

SUMMARY OF THE INVENTION

The present invention has been accomplished under the circumstances in view. It is the main object of the present invention to provide an apparatus foot piece which effectively prohibits vermin from entering the apparatus. According to the invention, the vermin-protective foot piece is comprised of a cylindrical base, a cup-like shield covered on the cylindrical base around the upper part of the cylindrical base, and a plurality of naked wires mounted around the periphery of the upper part of the cylindrical base and alternatively connected to the positive and negative terminals of power supply. When a vermin creeps up the cylindrical base and touches two adjacent naked wires, en electric shock is produced to kill the vermin.

DETAILED DESCRIPTION OF THE PREFERRED EMBODIMENT

Figure 2:
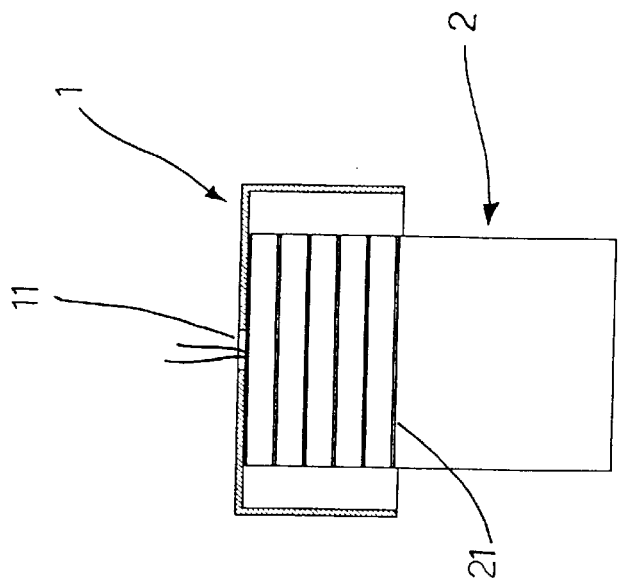
FIG. 2 is a sectional assembly view of the vermin-protective foot piece shown in FIG. 1.
Figure 1:
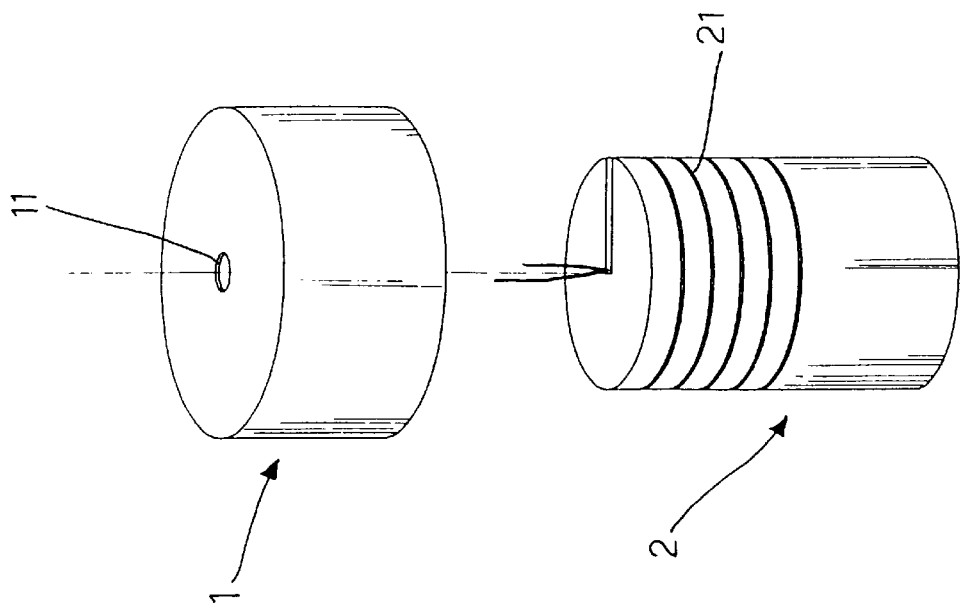
FIG. 1 is an exploded view of a vermin-protective foot piece according to the present invention.

Referring to FIGS. 1 and 2, a vermin-protective foot piece in accordance with the present invention is generally comprised of a cup-like shield 1, and a cylindrical base 2. The inner diameter of the cup-like shield 1 is greater than the outer diameter of the cylindrical base 2. The cylindrical base 2 is adhered to the inside of the cup-like shield 1 at the center, and spaced from the peripheral wall of the cup-like shield 1 at a distance. The cup-like shield 1 has a wire hole 11 at the center. The height of the cup-like shield 1 is shorter than the height of the cylindrical base 2. When the cup-like shield 1 and the cylindrical base 2 are fastened together, the bottom end of the cylindrical base 2 protruded from the bottom side of the cup-like shield 1 at a distance. A plurality of naked wires 21 are mounted around the cylindrical base 2, and alternatively connected to positive and negative terminals of power supply by an electrical wire passing through the wire hole 11.

Figure 3:
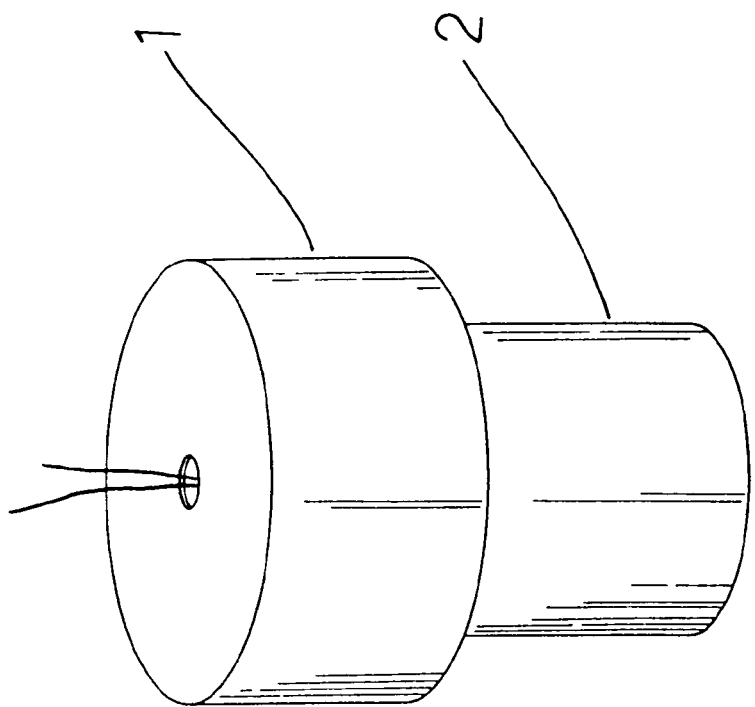
FIG. 3 is a perspective view of FIG. 2.
Figure 4:
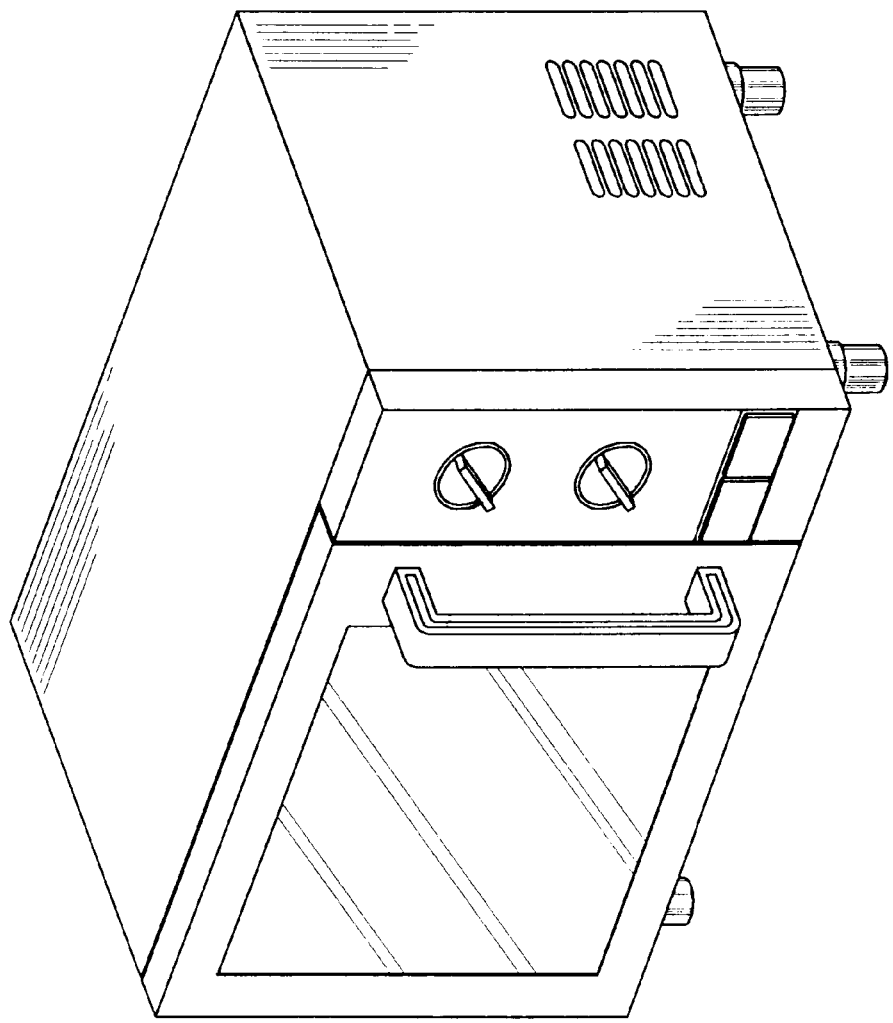
FIG. 4 is an applied view of the present invention, showing the vermin-protective foot piece installed in a micro-wave oven at the bottom side.

Referring to FIG. 4 and FIGS. 2 and 3 again, when the vermin-protective foot piece is installed in an apparatus for example a micro-wave oven, the lead ends of the naked wires 21 are respectively connected to the positive and negative terminals of power supply. When a vermin creep up the cylindrical base 2 and simultaneously touches two adjacent naked wires 21, an electric shock is produced to kill the vermin. Because the naked wires 21 are protected within the holding space of the cup-like shield 1, the vermin-protective foot piece is safe in use.

While only one embodiment of the present invention has been shown and described, it will be understood that various modifications and changes could be made thereunto without departing from the spirit and scope of the invention disclosed.

What the invention claimed is:

1. A vermin-protective foot piece adapted to be mounted on a bottom of an apparatus to support the apparatus on a flat surface and to prohibit vermin from entering the apparatus, comprising:

a cylindrical base;

a cup-shaped shield covered said cylindrical base around an upper part of said cylindrical base, said cup-shaped shield having a wire hole at a center; and a plurality of naked wires arranged around said cylindrical base and alternatingly connected to positive and negative terminals of power supply, said naked wires each having a lead end respectively inserted through the wire hole on said cup-shaped shield and connected to the power supply; wherein said naked wires are mounted around the periphery of said cylindrical base at different elevations, and said naked wires are connected to an electric power supply circuit of the apparatus on which the foot piece is mounted.

* * * * *